No. 879,550. PATENTED FEB. 18, 1908.
C. A. HUFFMASTER.
PIPE COUPLING.
APPLICATION FILED NOV. 20, 1906.

WITNESSES:

INVENTOR
Charles A. Huffmaster.
BY
Geo. H. Strong
ATTORNEY

UNITED STATES PATENT OFFICE.

CHARLES A. HUFFMASTER, OF SAN LEANDRO, CALIFORNIA.

PIPE-COUPLING.

No. 879,550.  Specification of Letters Patent.  Patented Feb. 18, 1908.

Application filed November 20, 1906. Serial No. 344,209.

*To all whom it may concern:*

Be it known that I, CHARLES A. HUFFMASTER, citizen of United States, residing at San Leandro, in the county of Alameda and State of California, have invented new and useful Improvements in Pipe-Couplings, of which the following is a specification.

My invention relates to a coupling for pipes and the like.

It consists in the combination of parts and in details of construction which will be more fully explained by reference to the accompanying drawings, in which—

Figure 1:
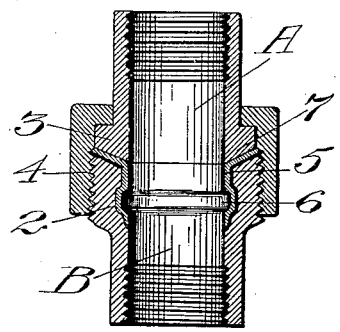
Figure 2:
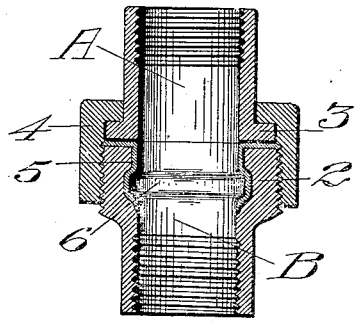

Figure 1 is a longitudinal section of my coupling showing a conical seat. Fig. 2 is a view showing a flat seat.

In the connection of pipes, hose or similar passages designed to convey fluid, it is customary to employ leather, rubber or equivalent gaskets which are clamped between the meeting ends of the parts to be coupled to prevent the escape of the fluid at such points.

My invention is designed to provide a durable and efficient means for forming a joint at the junction of such conductors and one which cannot be destroyed by high temperatures or pressure.

As shown in the drawings A and B are two sections of pipe which are to be connected. One of these sections has the usual screw-threaded flange 2 at the end, and the other has the enlarged plain flange 3.

4 is a shouldered sleeve or coupling device having an inwardly turned flange at one end which engages with the plain collar 3 of one of the sections and the other end of the sleeve is screw-threaded to engage with the screw-threaded end 2 of the pipe B.

The union is made in the usual manner by turning the sleeve 4, the periphery of the sleeve being made polygonal or otherwise provided with means for readily turning it until the meeting ends are forced together. In order to make a tight joint at this point, I employ a metal sleeve 5, which may be made of any soft compressible metal, such as copper.

The interior of the head 2 of the pipe B has an annular depression made in it as shown at 6. The sleeve 5 is expanded or spun into the interior of the head so as to fit and be interlocked with the depression 6, thus retaining it firmly in place.

In Fig. 1, I have shown the end of the pipe A as made slightly conical as at 7, and the corresponding end of the pipe B is beveled so as to correspond in shape with the cone 7. The outer end of the sleeve 5 is expanded while being spun into place so that its surface is beveled or inclined to correspond with the bevel 7 of the part A, and by turning the coupling sleeve 4, the parts are drawn together and a conical-shaped valve and seat are formed between the pipes.

In Fig. 2 I have shown the meeting ends of the pipes as being flat, and in this case the projecting end of the sleeve 5 is turned over in the spinning or fitting process until it is substantially flat upon the end of the head 2. The end of the head A in this case is also made flat and is seated upon the soft metal flange so as to form a tight joint, as in the previous construction. By the use of this joint forming sleeve or gasket of metal, I am enabled to employ pipes and connections which are made of iron and are very cheap, while the amount of copper, lead, or other soft metal to form the joint is comparatively small. A joint formed in this manner cannot be blown out by any pressure, and it is exceedingly durable and permanent, not being affected by hot liquids or gases.

Having thus described my invention, what I claim and desire to secure by Letters Patent, is—

The combination with pipe sections and a union sleeve or collar therefor, one of said sections having an annular depression on its interior, and a tubular sleeve of soft compressible metal having a portion intermediate of its ends expanded into said depression to permanently lock the sleeve to the section, and having its outer end turned outwardly and adapted to be clamped between the adjacent ends of the sections.

In testimony whereof I have hereunto set my hand in presence of two subscribing witnesses.

CHARLES A. HUFFMASTER.

Witnesses:
 THO. H. JOHNSON,
 A. B. THOMAS.